(12) United States Patent
Yamakawa

(10) Patent No.: US 7,216,991 B2
(45) Date of Patent: May 15, 2007

(54) LIGHTING UNIT AND PROJECTOR INCLUDING THE SAME

(75) Inventor: Hidemasa Yamakawa, Azasagawa-mura (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 10/934,365

(22) Filed: Sep. 7, 2004

(65) Prior Publication Data

US 2005/0052868 A1 Mar. 10, 2005

(30) Foreign Application Priority Data

Sep. 8, 2003 (JP) .............................. 2003-315588

(51) Int. Cl.
*G03B 21/20* (2006.01)
(52) U.S. Cl. .................... 353/87; 353/102; 362/277
(58) Field of Classification Search .................. 353/85, 353/87, 97, 98, 102; 349/57, 61–64; 362/277, 362/282, 285, 291, 341, 372; G03B 21/20
See application file for complete search history.

(56) References Cited

U.S. PATENT DOCUMENTS 6,246,526 B1 * 6/2001 Okuyama ................... 359/621
6,467,911 B1 * 10/2002 Ueyama et al. ............... 353/87
2002/0080612 A1 * 6/2002 Ozawa et al. ................ 362/268
2005/0128435 A1 * 6/2005 Yamauchi et al. ............ 353/20

FOREIGN PATENT DOCUMENTS

| JP | A 02-230229 | 9/1990 |
| JP | 11-212023 A | 8/1999 |
| JP | A 2000-162542 | 6/2000 |

\* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

Exemplary embodiments of the present invention provide a lighting unit including a lamp device adjusted by a general-purpose measuring device at high working efficiency, and yet allowing efficient utilization of light from a light source. In a light source device, since a first fly's eye has a concave entrance surface having a predetermined curvature, luminous flux entering the first fly's eye optical system and passing through the entrance surface is collimated to be parallel with an optical axis. Accordingly, illumination lights entering respective liquid crystal light valves are precisely superposed while allowing the angles of incidence of respective partial luminous fluxes entering the respective liquid crystal light valves to fall within a predetermined angle range, thereby enhancing utilization efficiency of the illumination lights.

8 Claims, 4 Drawing Sheets

LIGHTING UNIT AND PROJECTOR INCLUDING THE SAME

BACKGROUND OF THE INVENTION

1. Field of Invention

Exemplary embodiments of the present invention relate to a lighting unit suitable for illuminating a spatial light modulation device such as a liquid crystal light valve and a projector including the lighting unit.

2. Description of Related Art

The related art includes a lighting unit for a liquid crystal projector which includes splitting and superposing devices to split a luminous flux from a lamp device having a lamp and a parabolic mirror into a plurality of partial luminous fluxes and to superpose those on an illuminated area. According to the lighting unit of this type, the splitting and superposing devices additionally contain such a device as an afocal optical system to narrow a width of luminous flux. The afocal optical system decreases an angle of incidence of each partial luminous flux which reaches the illuminated area to enhance utilization efficiency of illumination light, as disclosed in related art document JP-A-11-212023.

SUMMARY OF THE INVENTION

In the lighting unit described above, it is necessary to precisely align a light emission point of the lamp with a focus position of the parabolic mirror in view of efficient utilization of light of a light source, but such alignment is practically difficult. More specifically, as disclosed in the related art, a method to align the emission point of the lamp with the focus of the parabolic mirror includes an integrating sphere disposed several meters ahead from the lamp device. Additionally, the emission point of the lamp is shifted toward the focus of the parabolic mirror such that the maximum quantity of light is detected in the integrating sphere. In this method, however, the emission point of the lamp is established at a position several hundred of microns backward, i.e., toward an axial center of the parabolic mirror from the focus of the parabolic mirror which is actually the best position for the emission point of the lamp.

The reason for the slight shift by the light emission point of the lamp is that the integrating sphere is disposed at a finite distance from the lamp device during measurement, as a measurement dark room used to adjust the lamp position of the lamp device is not spacious due to various limitations. It may be also possible to provide an optical system to adjust between the lamp device and the integrating sphere. However, the flexibility of the measurement device is lowered or the measurement procedures become complicated since the optical system to adjust needs to be replaced with an appropriate one in accordance with the specification of an integrator disposed downstream of the lamp device and the size or the focus distance of the parabolic mirror.

Accordingly, exemplary embodiments of the invention provide a lighting unit including a lamp device which is adjustable by a general-purpose measuring device with high working efficiency, and yet allowing efficient utilization of light from a light source.

A lighting unit according to exemplary embodiments of the present invention include: (a) a light emission member to emit light of a light source; (b) a rotational parabolic mirror to collimate luminous flux of the light of the light source emitted from the light emission member; (c) secondary light source forming device to wavefront-split the light of the light source having passed through the rotational parabolic mirror to form a plurality of secondary light sources; (d) a superposing optical system to superpose the lights from the plural secondary light sources and project the lights on a predetermined surface; and (e) lens device having negative power to provide a predetermined divergent component for the light of the light source.

In the above-described lighting unit, the lens device having negative power gives the predetermined divergent component to the light of the light source. Thus, even when the light of the light source having passed the rotational parabolic mirror converges more than a predetermined value due to positioning of the light emission member and the rotational parabolic mirror, the convergence of the light of the light source can be cancelled by the lens means, addressing or achieving efficient utilization of the light of the light source on an illuminated region. Additionally, when the light emission member is displaced by a predetermined distance from the actual best position in a direction opposite to the secondary light source forming device due to a reason of a measuring device in alignment of the light emission member and the rotational parabolic mirror, for example, the light of the light source having passed through the rotational parabolic mirror slightly converges in correspondence with this displacement.

In a specific exemplary aspect of the invention, the light emission member is slightly displaced by a predetermined distance from the focus position of the rotational parabolic mirror in a backward direction opposite to the secondary light source forming device. In this exemplary aspect, the light of the light source having passed through the rotational parabolic mirror slightly converges, but such displacement and convergence can be cancelled by the lens device, thereby providing efficient illumination.

In another specific exemplary aspect of the invention, the lens device has negative power to compensate for the predetermined displacement. In this exemplary aspect, the addition of the lens device allows the light of the light source having passed through the rotational parabolic mirror to be treated in the same manner as completely parallel luminous flux.

In another specific exemplary aspect of the invention, the predetermined displacement of the light emission member is caused when the light emission member is aligned with respect to the rotational parabolic mirror by utilizing an integrating sphere. In this exemplary aspect, the lighting unit can be aligned with high rapidity and repeatability by using the integrating sphere. Additionally, the existence of the lens device allows the light of the light source to be efficiently utilized while permitting alignment error of the lighting unit.

In another exemplary aspect of the invention, the lens device is disposed on an optical path from the light source to the secondary light source forming device. In this exemplary aspect, highly accurate positioning of the lens device is not required and the specification of the downstream secondary light source forming device is affected little. Thus, assembling of the lens device is facilitated, providing a highly accurate lighting unit.

In another exemplary aspect of the invention, the lens device is a concave lens disposed in the upstream of the second light source forming device. In this exemplary aspect, the lens device can be incorporated with ease.

In another exemplary aspect of the invention, the secondary light source forming device is formed by a pair of fly's eye lenses each having divided lenses on its surface which is opposed to each other, and the lens device is a concave surface formed as an entrance surface of the concave mirror side fly's eye lens of the one pair of the fly's eye lenses. In this exemplary aspect, the secondary light source device offers both functions so as to decrease the number of the optical components used.

In another exemplary aspect of the invention, a color-splitting optical system to split the light of the light source having passed through the secondary light source forming device into illumination lights in respective colors is further included. In this exemplary aspect, color light sources corresponding to the respective colors can be offered.

A first projector according to exemplary embodiments of the invention includes: (a) a lighting unit described above; (b) a spatial light modulation device illuminated by illumination light emitted from the lighting unit; and (c) a projection optical system to project image light from the spatial light modulation device.

In the above-described first projector, since the lighting unit of exemplary embodiments of the invention having the characteristics as described above is used, the spatial light modulation device can be illuminated by utilizing the light of the light source efficiently. Thus, images having high brightness and high picture quality can be projected.

A second projector according to exemplary embodiments of the invention includes: (a) a lighting unit described above; (b) a plurality of spatial light modulation devices for respective colors illuminated by illumination lights in the respective colors emitted from the color-splitting optical system; (c) a light synthesizing member to synthesize image lights in the respective colors from the plural spatial light modulation devices and releasing the synthesized lights; and (d) a projection optical system to project image lights synthesized by the light synthesizing member.

In the above-described second projector, since the lighting unit of the invention having the characteristics described above is used, the spatial light modulation devices can be illuminated by utilizing the light of the light source efficiently. Thus, images having high brightness and high picture quality can be projected.

DETAILED DESCRIPTION OF PREFERRED EMBODIMENTS

A projector of a first exemplary embodiment according to the present invention is hereinafter described in conjunction with the drawings.

Figure 1:
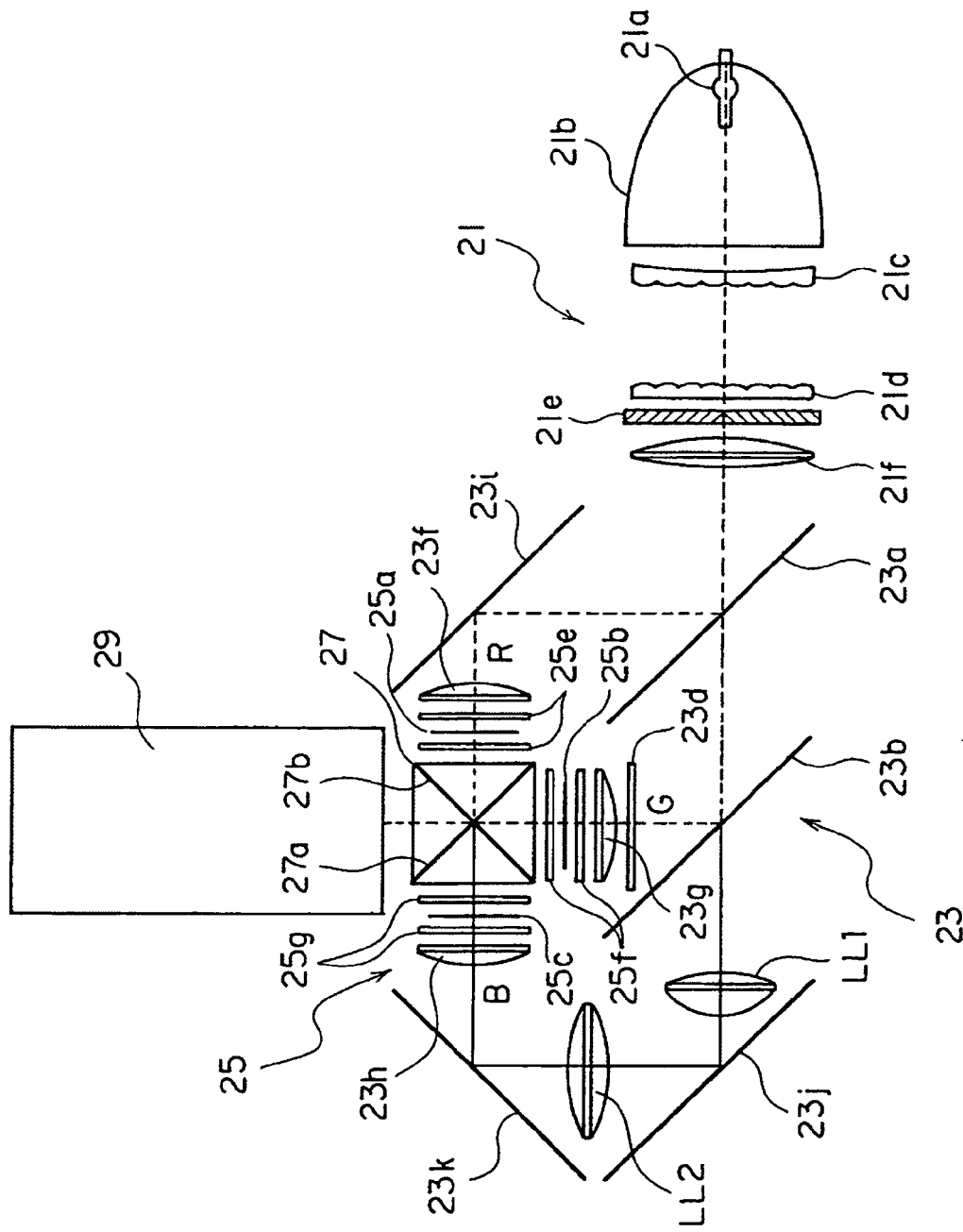
FIG. 1 is a schematic of an optical system of a projector in a first exemplary embodiment.

FIG. 1 is a schematic explanatory view of an optical system of the projector in the first exemplary embodiment. A projector 10 includes: a light source device 21 to emit light of the light source; a color-splitting optical system 23 to split the light from the light source device 21 into three colors of R, G and B; a light modulation area 25 which is illuminated by illumination lights in the respective colors released from the color-splitting optical system 23; a cross dichroic prism 27 as a light synthesizing member to synthesize image lights in the respective colors released from the light modulation area 25; and a projection lens 29 as a projection optical system to project the image lights passing through the cross dichroic prism 27 on a screen (not shown).

The light source device 21 contains a light source lamp 21a, a rotational parabolic mirror 21b, a pair of fly's eye optical systems 21c and 21d as integrators, a polarizing conversion member 21e, and a superposing lens 21f. The light source lamp 21a is a light emission member such as a high pressure mercury lamp, and emits white light as the light of the light source. The rotational parabolic mirror 21b collimates the light of the light source emitted from the light source lamp 21a to provide substantially parallel luminous flux. The one pair of the fly's eye optical systems 21c and 21d are secondary light source forming devices each of which has a divided lens surface composed of a plurality of component lenses arranged in a matrix and disposed to be opposed to each other. These component lenses wavefront-split the light of the light source emitted from the light source lamp 21a and discretely make the split lights converge and diverge. The polarizing conversion member 21e converts the light of the light source released from the second fly's eye optical system 21d into only an S-polarized component, for example, which extends in a direction perpendicular to the surface of the sheet of FIG. 1, and supplies the converted light to a next optical system. The superposing lens 21f is a superposing optical system formed by a convex lens which appropriately converges the illumination light having passed through the polarizing conversion member 21e as a whole and provides superposed illumination on respective illumination regions formed on spatial light modulation devices for respective colors. More specifically, the illumination light having passed through both the fly's eye optical systems 21c and 21d and the superposing lens 21f goes through the color-splitting optical system 23 described below in detail. Subsequently, the illumination light is superposed to uniformly illuminate indicated regions of liquid crystal light valves 25a–25c for the respective colors as the spatial light modulation devices for the respective colors each constituting the light modulation area 25.

The color-splitting optical system 23 includes a first and a second dichroic mirrors 23a and 23b, three field lenses 23f–23h, and reflecting mirrors 23i–23k, and forms the lighting unit together with the light source device 21. The first dichroic mirror 23a reflects R light of the three colors R, G and B and transmits G and B lights. The second dichroic mirror 23b reflects the G light of the two colors G and B and transmits the B light. In the color-splitting optical system 23, the R light reflected by the first dichroic mirror 23a passes through the reflecting mirror 23i and enters the field lens 23f to adjust the angle of incidence remaining as the S-polarized light. The G light passing through the first dichroic mirror 23a and reflected by the second dichroic mirror 23b goes through a λ/2 phase-contrast plate 23d to convert S-polarization into P-polarization, and enters the field lens 23g.

The B light having passed through the second dichroic mirror 23b goes through relay lenses LL1 and LL2 and the reflecting mirrors 23j and 23k to compensate for optical path difference, and enters the field lens 23h to adjust the angle of incidence remaining as the S-polarized light.

The light modulation area 25 includes three liquid crystal light valves 25a–25c and three pairs of polarization filters 25e through 25g disposed such that the liquid crystal light valves 25a–25c are each interposed between each pair of the polarization filters 25e–25g. The R light reflected by the first dichroic mirror 23a enters the liquid crystal light valve 25a through the field lens 23f. The G light passing through the first dichroic mirror 23a and reflected by the second dichroic mirror 23b enters the liquid crystal light valve 25b through the λ/2 phase-contrast plate 23d and the field lens 23g. The B light passing through both of the first and the second dichroic mirrors 23a and 23b enters the liquid crystal light valve 25c through a field lens 23h though intermediate steps the description of which is omitted herein. The respective liquid crystal light valves 25a–25c are spatial light modulation devices of non-emission type to modulate spatial strength distributions of the incident illumination light. The lights in three colors each of which enters the liquid crystal valves 25a–25c are two-dimensionally modulated in accordance with driving signals or image signals inputted to the liquid crystal light valves 25a–25c as electric signals.

At this stage, the polarization directions of the illumination lights entering the respective liquid crystal light valves 25a–25c are adjusted by the polarizing filters 25e through 25g, and modulated lights in predetermined directions are extracted from modulated lights released from the respective liquid crystal light valves 25a–25c.

The cross dichroic prism 27 is a light synthesizing member which accommodates dielectric multi-layered film 27a to reflect the R light and a dielectric multi-layered film 27b to reflect the B light crossing each other at right angles. The cross dichroic prism 27 reflects the R light from the liquid crystal light valve 25a by the dielectric multi-layered film 27a to release the light to the right with respect to the traveling direction, and reflects the G light from the liquid crystal light valve 25b by the dielectric multi-layered films 27a and 27b to release the light straight, and reflects the B light from the liquid crystal light valve 25c by the dielectric multi-layered film 27b to release the light to the left with respect to the traveling direction. The synthetic light thus superposed by the cross dichroic prism 27 enters the projection lens 29 to project images in a desired size on the screen.

Figure 2:
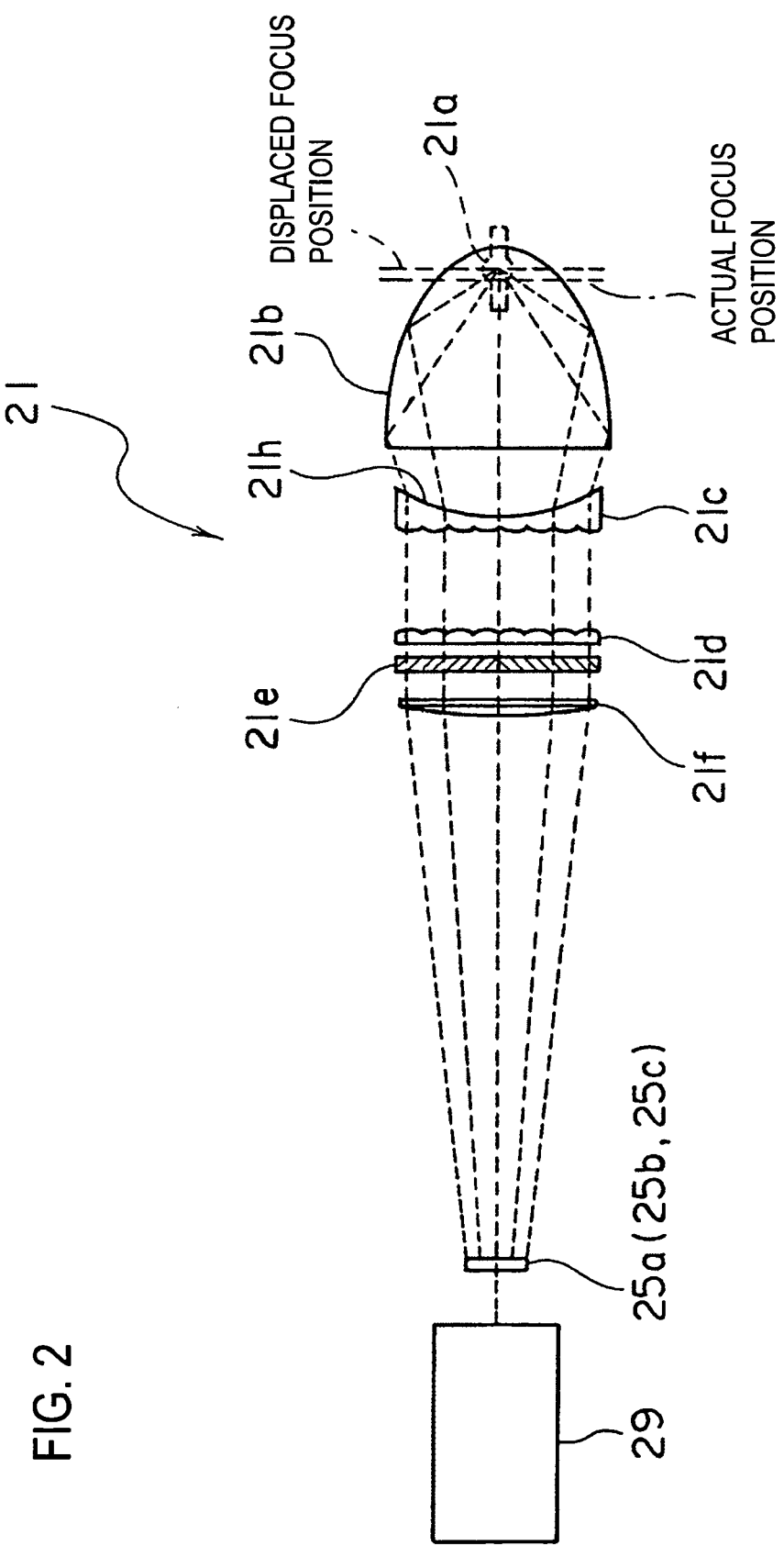
FIG. 2 is a schematic that shows a function of a light source device.

FIG. 2 is a schematic that shows the function of the light source device 21 of the projector 10 in FIG. 1. In this arrangement, the light source lamp 21a is not disposed at the actual focus position of the rotational parabolic mirror 21b, but is offset by a small distance backward, i.e., in a direction opposite to the fly's eye optical systems 21c and 21d to be disposed at a focus position shifted in an optical axis direction. As a result, the light of the light source emitted from the light source lamp 21a and reflected by the rotational parabolic mirror 21b does not become completely parallel luminous flux, slightly converging toward the front where the fly's eye optical systems 21c and 21d are disposed. However, since the first fly's eye optical system 21c has a concave incident surface 21h as a lens device on the side of the light source lamp 21a, the luminous flux entering the first fly's eye optical system 21c and passing through the incident surface 21h is collimated to be parallel with the optical axis. More specifically, the same result is obtained as in the case when luminous flux parallel with an optical axis enters a flat incident surface 21h of a related art fly's eye optical system 21c. Thus, the illumination lights entering the respective liquid crystal light valves 25a–25c are accurately superposed while allowing the angles of incidence of the respective partial luminous fluxes entering the respective liquid crystal light valves 25a–25c to fall within a predetermined range, thereby increasing the utilization efficiency of the illumination light and providing a bright light source.

Figure 3:
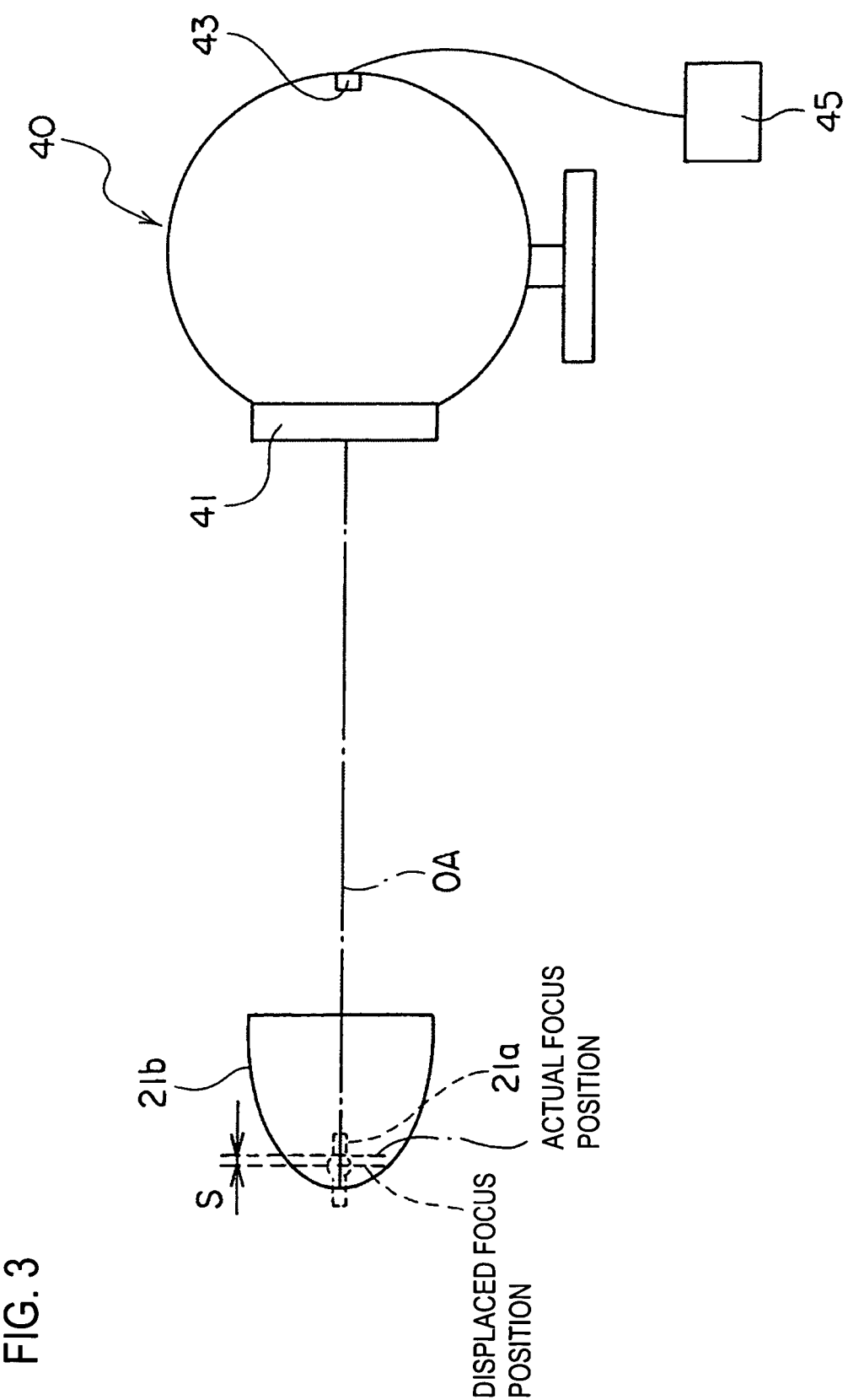
FIG. 3 is a schematic showing alignment of a light source lamp.

FIG. 3 is a schematic that illustrates alignment of the light source lamp 21a with respect to the rotational parabolic mirror 21b. The light source lamp 21a is temporarily fixed to the rotational parabolic mirror 21b in advance, and the rotational parabolic mirror 21b in this condition is secured to a holder for measurement (not shown). In this arrangement, an integrating sphere 40 is disposed in front of the rotational parabolic mirror 21b several meters away therefrom. The integrating sphere 40 has an entrance window 41 to collect light from the light source lamp 21a, and an optical sensor 43 positioned inside the sphere to detect incident strength of light from the entrance window 41. The optical sensor 43 is connected with a power meter 45 to visually indicate the strength of the detected light. In measurement, light is emitted from the light source lamp 21a and the strength of the light of the light source is detected in the opposed integrating sphere 40. At this stage, a position of the light source lamp 21a where the maximum value is outputted from the power meter 45 is detected by monitoring the output values from the power meter 45 with slight displacement of the light source lamp 21a with respect to the rotational parabolic mirror 21b in a direction of an optical axis OA. Subsequently, the light source lamp 21a is permanently fixed at the maximum output position with respect to the rotational parabolic mirror 21b.

According to this arrangement, since the integrating sphere 40 is disposed a finite distance away from the light source lamp 21a and the rotational parabolic mirror 21b, the emission point of the light source lamp 21a is shifted by a shift value s from the actual focus position of the rotational parabolic mirror 21b which is actually the best position for the emission point toward the inner part of the rotational parabolic mirror 21b, i.e., in the backward direction. The shift value s is typically around several hundred microns, but varies according to the distance from the rotational parabolic mirror 21b to the integrating sphere 40 and the focus distance of the rotational parabolic mirror 21b. If the distance from the rotational parabolic mirror 21b to the integrating sphere 40 is fixed, the shift value s in accordance with the specification of the rotational parabolic mirror 21b such as the focus distance is kept constant, thereby stabilizing the positioning of the light source lamp 21a with offset in a fixed direction. When the light source lamp 21a is secured at a position offset by the shift value s in the backward direction, that is, disposed at an offset focus position as described above, the light of the light source emitted from the light source lamp 21a and reflected by the rotational parabolic mirror 21b slightly converges toward the front where the fly's eye optical systems 21c and 21d are positioned. This convergence of the light of the light source can be cancelled by a lens or others having negative power corresponding to the shift value s. More specifically, as illustrated in FIG. 2, the entrance surface 21h of the first fly's eye optical system 21c has a concave surface having a predetermined curvature and collimates the luminous flux entering the first fly's eye optical system 21c and passing through the entrance surface 21h to provide luminous flux parallel to the optical axis. The curvature of the entrance surface 21h of the first fly's eye optical system 21c can be easily calculated from the shift value s of the light source lamp 21a. When the focus distance of the rotational parabolic mirror 21b is f and a refractive index of an optical material of the first fly's eye optical system 21c is n, a radius of curvature R of the entrance surface 21h can be calculated from the following equation.

$$R=(n-1)\times f^2/s$$

In a specific unit, when s=0.18 mm and the radius of curvature R of the entrance surface 21h falls in the range of 700<R<1,300 mm, for example, the illumination light can be efficiently supplied to the respective liquid crystal valves 25a–25c. Thus, the utilization efficiency of the illumination light is enhanced and the brightness of the projector is thereby increased.

The operation of the projector 10 in this exemplary embodiment is now described. The light from the light source device 21 is color-split by the first and the second dichroic mirrors 23a and 23b included in the color-splitting optical system 23. The split illumination lights enter the corresponding liquid crystal valves 25a–25c. The respective liquid crystal valves 25a–25c have two-dimensional refractive index distributions modulated according to image signals from outside, and modulate the illumination light two-dimensionally per pixel. As described above, the illumination lights, i.e., the image lights modulated by the respective liquid crystal light valves 25a–25c are synthesized by the cross dichroic prism 27, and enter the projection lens 29. The image lights having entered the projection lens 29 are projected on the not-shown screen. Since the entrance surface 21h of the first fly's eye optical system 21c is a concave surface having the predetermined curvature in the light source device 21, the luminous flux entering the first fly's eye optical system 21c and passing through the entrance surface 21h is collimated to be parallel to the optical axis. Accordingly, the illumination lights entering the respective liquid crystal light valves 25a–25c can be accurately superposed while allowing the angles of incidence of the respective partial luminous fluxes entering the respective liquid crystal valves 25a–25c to fall within a predetermined angle range, thereby enhancing utilization efficiency of the illumination light.

A projector in a second exemplary embodiment according to the present invention is hereinafter described with reference to the drawings.

The projector in the second exemplary embodiment is formed by partially modifying the projector in the first exemplary embodiment, and identical numerical numbers are given to identical parts and repetitive explanation for those is omitted.

Figure 4:
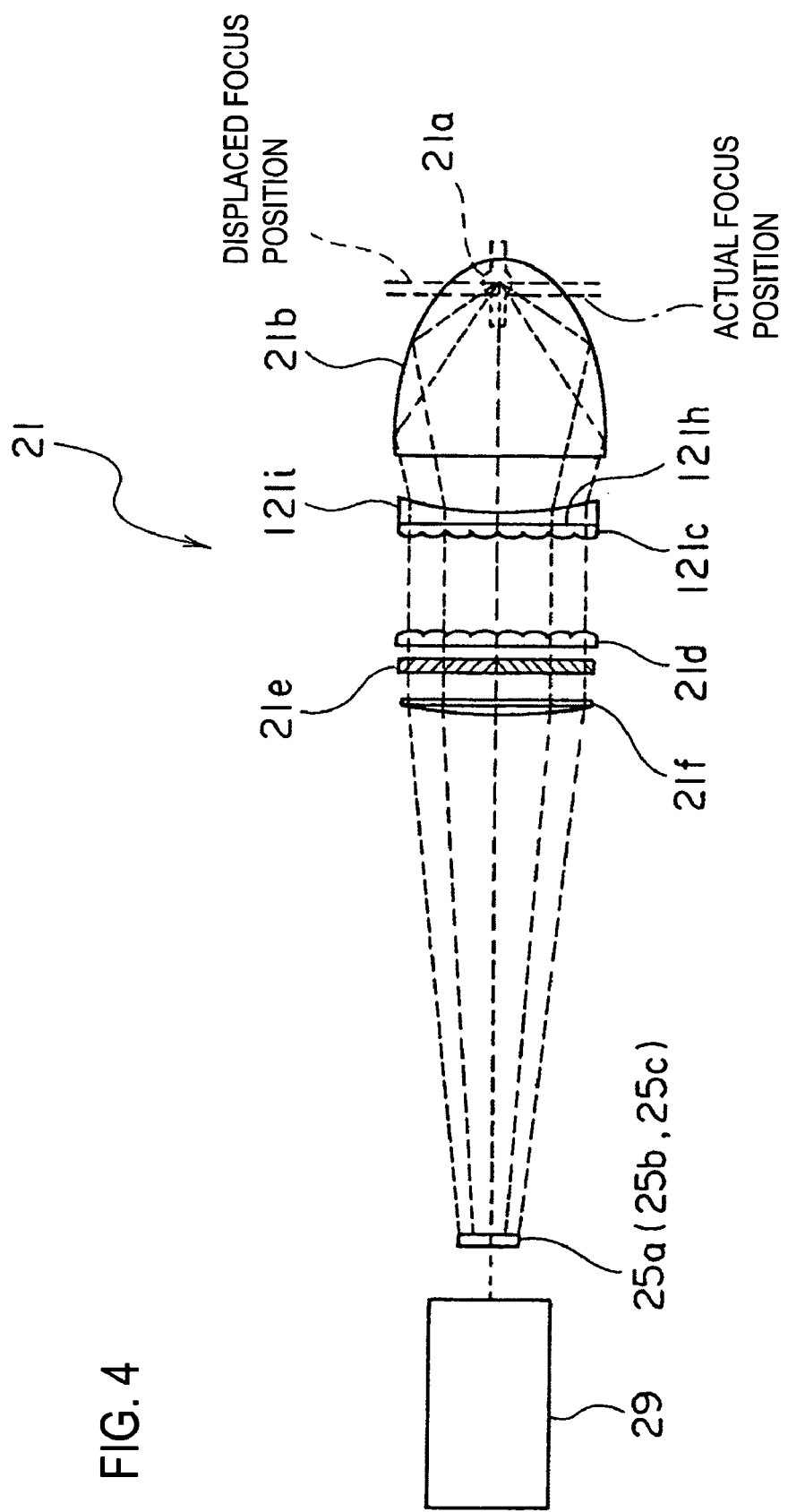
FIG. 4 is a schematic of an optical system of a projector in a second exemplary embodiment.

FIG. 4 is a schematic explanatory view of a projector in the second exemplary embodiment. This projector includes an ordinary type first fly's eye optical system 121c having a flat entrance surface 121h and a concave lens 121i as a lens device instead of the first fly's eye optical system 21c shown in FIG. 2. In the second exemplary embodiment, since the concave lens 121i to correct displacement of the light source lamp 21a from the actual focus position is attached in the upstream of the first fly's eye optical system 121c, the luminous flux entering the first fly's eye optical system 121c is collimated to be accurately parallel to the optical axis. Accordingly, the illumination lights entering the respective liquid crystal light valves 25a–25c are precisely superposed while allowing the angles of incidence of the respective partial luminous fluxes entering the respective liquid crystal light valves 25a–25c to fall within a predetermined angle range, thereby enhancing utilization efficiency of the illumination lights.

While several exemplary embodiments according to the invention have been described herein, the scope of the invention is not limited to those. For example, the lens means 21h and 121i for making the luminous flux from the light source diverge at a small angle are disposed on an optical path from the rotational parabolic mirror 21b to the first fly's eye optical systems 21c and 121c in the above exemplary embodiments. However, in lieu of these lenses, lens devices formed by a concave lens and the like may be provided on an optical path from the first fly's eye optical systems 21c and 121c to the superposing lens 21f.

Additionally, an afocal optical system to narrow the width of the luminous flux from the light source may be incorporated between the first fly's eye optical systems 21c and 121c and the second fly's eye optical systems 21d. This structure decreases the angles of incidence of the respective partial luminous fluxes entering the liquid crystal light valves 25a–25c, thereby further enhancing or improving utilization efficiency of the illumination light.

What is claimed is:

1. A lighting unit, comprising:
   a light source;
   a light emission member to emit light from the light source;
   a rotational parabolic mirror to collimate luminous flux of the light of the light source emitted from the light emission member;
   a secondary light source forming device to wavefront-split the light of the light source having passed through the rotational parabolic mirror to form a plurality of secondary light sources;
   a superposing optical system to superpose the lights from the plurality of secondary light sources and to project the lights on a predetermined surface; and
   a lens device having negative power to provide a predetermined divergent component for the light of the light source,
   the light emission member being slightly displaced by a predetermined distance from a focus position of the rotational parabolic mirror in a backward direction opposite to the secondary light source forming device, and
   the lens device having negative power to compensate for the predetermined displacement.

2. The lighting unit according to claim 1, the predetermined displacement of the light emission member being caused when the light emission member is aligned with respect to the rotational parabolic mirror by utilizing an integrating sphere.

3. The lighting unit according to claim 1, the lens device being disposed on an optical path from the light source to the secondary light source forming device.

4. The lighting unit according to claim 3, the lens device being a concave lens disposed upstream of the secondary light source forming device.

5. The lighting unit according to claim 3, the secondary light source forming device being formed by a pair of fly's eye lenses each having divided lenses on its surface which is opposed to each other and the lens device being a concave surface formed as an entrance surface of the fly's eye lens on the concave mirror.

6. The lighting unit according to claim 1, further comprising:
   a color-splitting optical system to split the light of the light source having passed through the secondary light source forming device into illumination lights in respective colors.

7. A projector, comprising:
   a lighting unit according to claim 6;
   a plurality of spatial light modulation devices for respective colors illuminated by illumination lights in the respective colors emitted from the color-splitting optical system;
   a light synthesizing member to synthesize image lights in the respective colors from the plural spatial light modulation devices and to release the synthesized lights; and
   a projection optical system to project image lights synthesized by the light synthesizing member.

8. A projector, comprising:
a lighting unit according to claim 1;
a spatial light modulation device illuminated by illumination light emitted from the lighting unit; and
a projection optical system to project image light from the spatial light modulation device.

* * * * *